US008553989B1

(12) United States Patent
Owechko et al.

(10) Patent No.: US 8,553,989 B1
(45) Date of Patent: Oct. 8, 2013

(54) THREE-DIMENSIONAL (3D) OBJECT RECOGNITION SYSTEM USING REGION OF INTEREST GEOMETRIC FEATURES

(75) Inventors: Yuri Owechko, Newbury Park, CA (US); Swarup Medasani, Thousand Oaks, CA (US); Jim Nelson, Sumner, WA (US)

(73) Assignee: HRL Laboratories, LLC, Malibu, CA (US)

( * ) Notice: Subject to any disclaimer, the term of this patent is extended or adjusted under 35 U.S.C. 154(b) by 509 days.

(21) Appl. No.: 12/799,618

(22) Filed: Apr. 27, 2010

(51) Int. Cl.
*G06K 9/00* (2006.01)
(52) U.S. Cl.
USPC ............ 382/224; 345/419; 382/181; 382/154
(58) Field of Classification Search
USPC ................................................. 382/154–224
See application file for complete search history.

(56) References Cited

U.S. PATENT DOCUMENTS

| | | | |
|---|---|---|---|
| 6,850,587 B1* | 2/2005 | Karimi et al. | 378/15 |
| 7,471,832 B2* | 12/2008 | Luo et al. | 382/224 |
| 7,496,228 B2* | 2/2009 | Landwehr et al. | 382/170 |
| 7,499,586 B2* | 3/2009 | Agarwala et al. | 382/154 |
| 7,558,762 B2 | 7/2009 | Owechko et al. | |
| 7,606,425 B2* | 10/2009 | Bazakos et al. | 382/224 |
| 7,672,911 B2 | 3/2010 | Owechko et al. | |
| 7,689,033 B2* | 3/2010 | Xiao et al. | 382/159 |
| 7,815,572 B2* | 10/2010 | Loupas | 600/441 |
| 7,916,951 B2* | 3/2011 | Landwehr et al. | 382/224 |
| 8,253,831 B2* | 8/2012 | Bobbitt et al. | 348/274 |
| 2002/0050924 A1* | 5/2002 | Mahbub | 340/426 |
| 2002/0118874 A1* | 8/2002 | Chung et al. | 382/154 |
| 2003/0016858 A1* | 1/2003 | DeYong et al. | 382/149 |
| 2005/0201591 A1* | 9/2005 | Kiselewich | 382/104 |
| 2006/0110068 A1* | 5/2006 | Luo et al. | 382/289 |
| 2006/0233436 A1* | 10/2006 | Ma et al. | 382/154 |
| 2008/0123961 A1* | 5/2008 | Nelson | 382/190 |
| 2009/0153659 A1* | 6/2009 | Landwehr et al. | 348/135 |
| 2010/0134625 A1* | 6/2010 | Bobbitt et al. | 348/150 |
| 2012/0293635 A1* | 11/2012 | Sharma et al. | 348/50 |

OTHER PUBLICATIONS

Multi-View Classifier Swarms for Pedestrian Detection and Tracking, Payam Saisan, 2005 IEEE Computer Society Conference on Computer Vision and Pattern Recognition.*
Event Detection and Analysis from Video Streams, GeÂ rard Medioni, IEEE Transactions on Pattern Analysis and Machine Intelligence, vol. 23, No. 8, Aug. 2001.*

(Continued)

*Primary Examiner* — Jayesh A Patel
*Assistant Examiner* — Iman K Kholdebarin
(74) *Attorney, Agent, or Firm* — Tope-McKay & Associates

(57) ABSTRACT

The present invention relates to a method for three-dimensional (3D) object recognition using region of interest geometric features. The method includes acts of receiving an implicit geometry representation regarding a three-dimensional (3D) object of interest. A region of interest (ROI) is centered on the implicit geometry representation such that there is at least one intersection area between the ROI and the implicit geometry representation. Object shape features are calculated that reflect a location of the ROI with respect to the implicit geometry representation. The object shape features are assembled into a feature vector. A classification confidence value is generated with respect to a particular object classification. Finally, the 3D object of interest is classified as a particular object upon the output of a statistical classifier reaching a predetermined threshold.

24 Claims, 9 Drawing Sheets

(56) References Cited

OTHER PUBLICATIONS

Fast-Learning Viewnet Architectures for Recognizing Three-dimensional Objects from Multiple Two-dimensional Views, Gary Bradski and Stephen Grossberg, Neural Networks, vol. 8, No. 7]8, pp. 1053-1080, 1995.*

D. Nister and H. Stewenius, "Scalable recognition with a vocabulary tree," In Proc. CVPR , vol. 5, 2006.

S. Medasani and R. Krishnapuram, "Graph Matching by Relaxation of fuzzy assignments," IEEE Transactions on Fuzzy Systems, 9(1), 173-183, Feb. 2001.

R. Krishnapuram, S. Medasani, S. Jung and Y. Choi, "Content-Based Image Retrieval Based on a Fuzzy Approach," IEEE Transactions on Knowledge and Data Engineering (TKDE), Oct. 2004.

N. Oliver and A. Pentland, "Graphical models for driver behavior recognition in a smart car," Proc. of IV2000.

K. Sato and J.K. Aggarwal, "Temporal spatio-velocity transform and its application to tracking and interaction," CVIU 96(2004), 100-128.

S. Hongeng, R. Nevatia, and F. Bremond, "Vide-based event recognition: activity representation and probabilistic recognition methods," CVIU 96(2004), 129-162.

Medioni, I. Cohen, F. Bremond, S. Hongeng, R. Nevatia, "Event detection and analysis from video streams," IEEE PAMI 23(8), 2001, 873-889.

N. Oliver, A. Garg, and E. Horvitz, "Layered representations for learning and inferring office activity from multiple sensory channels," CVIU 96(2004), 163-180.

A. Amir, S. Basu, G. Iyengar, C. Lin, M. Naphade, J.R. Smith, S. Srinivasa, and B. Tseng, "A multi-modal system for retrieval of semantic video events," CVIU 96(2004), 216-236.

R.T. Collins, A. J. Lipton, and T. Kanade; "Introduction to the special section on video surveillance," IEEE-PAMI, 22(8), Aug. 2000.

N. Oliver, B. Rosario, and A. Pentland, "A Bayesian computer vision system for moceling human interactions," IEEE-PAMI, 22(8), Aug. 2000.

J.C. Bezdek, Pattern Recognition with Fuzzy Objective Function Algorithms, Plenum Press, New York, 1981.

M.P. Windham, "Numerical classification of proximity data with assignment measure," Journal of Classification, vol. 2, pp. 157-172, 1985.

S. Gold and A. Rangarajan, "A graduated assignment algorithm for graph matching," IEEE Transaction on Pattern Analysis and Machine Intelligence, vol. 18, pp. 377-387, Apr. 1996.

Z. Zhang, "A flexible new technique for camera calibration," IEEE Transactions on Pattern Analysis and Machine Intelligence, 22(11): 1330-1334, 2000.

Jean-Yves Bouguet, "Camera Calibration Toolbox for Matlab," http://www.vision.caltech.edu/bouguetj/calib_doc/.

Intel OpenCV Computer Vision Library (C++), http://www.intel.com/research/mrl/research/opencv/.

Giorgio Carpaneto, Paolo Toth, "Algorithm 548: Solution of the assignment problem [H]," ACM Transactions on Mathematical Software, 6(1): 104-111, 1980.

I. Hartley, A. Zisserman, "Multiple view geometry in computer vision," Cambridge University Press, Cambridge, UK 2000.

Longuet-Higgins, "A computer algorithm for reconstructing a scene from two projections" Nature, 293: 133-135, Sep. 1981.

T. Kailath, et al., "Linear Estimation," Prentice Hall, NJ, ISBN 0-13-022464-2, 854pp, 2000.

P. Saisan, "Modeling of Pedestrian Motion for recognition," IS&T/SPIE 17th annual symposium, San Jose, CA 2005.

A.R. Dick, et al., "Combining Single view recognition and multiple view stereo for architectural scenes," International Conference on Computer Vision (ICCV'01) vol. 1, Jul. 7-14, 2001, Vancouver, B.C., Canada.

G. Shakhanarovich, et al. "Integrated face and gait recognition from multiple views," In Proceedings of the IEEE Conference on Computer Vision and Pattern Recognition, Dec. 2001, Kauai, Hawaii.

Sujit Kuthirummal, et al., "Planar shape recognition across multiple views," In Proceedings of the Interationa Conference on Pattern Recognition (ICPR)—2002, Quebec, Canada.

Sujit Kuthirummal, et al., "Multiview constraints for recognition of planar curves in fourier domain," Proceedings of the Indian Conference on Vision Graphics and Image Processing (ICVGIP)—2002.

A. Selinger and R.C. Nelson, "Appearance-based object recognition using multiple views," In Proceedings of the IEEE Conference on Computer Vision and Pattern Recognition—Dec. 2001, Kauai, Hawaii.

D.L. Swets, et al., "Genetics Algorithms for Object Recognition in a complex scene," Proc. of Intl. Conference on Image Processing, vol. 2, Oct, pp. 23-26, 1995.

V. Ciesielski and M. Zhang, "Using Genetic Algorithms to Improve the Accuracy of Object Detection," In Proceedings of the third Pacific-Asia Knowledge Discovery and Data Mining Conference, Ning Zhong and Lizhu Zhou (Eds.), Knowledge Discovery and Data Mining—Research and Practical Experience. Tsinghua University Press, p. 19-24. Bejing, China, Apr. 26-31, 1999.

Kennedy, J., et al., "Swarm intelligence," San Francisco: Morgan Kaufmann Publishers, 2001.

R.C. Eberhart, et al., "Particle swarm optimization: Developments, applications, and resources," Proceedings of IEEE Congress on Evolutionary Computation (CEC 2001), Korea, 2001.

R. Brits, et al., "A Niching Particle Swarm Optimizer," 2002.

F. Rojas, I. Rojas, R. M. Clemente, and C.G. Puntoner, "Nonlinear blind source separation using genetic algorithms," In Proceedings of International Conference on Independent Component Analysis, 2001.

D. Beasley, D. R. Bull, and R. R. Martin, "A Sequential Niching Technique for Multimodal Function Optimization," Evolutionary Computation, 1(2), p. 101-125, 1993.

R. Krishnapuram and J. M. Keller, "Quantative Analysis of Properties and Spatial Relations of Fuzzy Image Regions," Transactions on Fuzzy Systems, 1(2):98-110, 1993.

Y. Owechko, S. Medasani, and N. Srinivasa, "Classifier Swarms for Human Detection in infrared imagery," Proc. of the CVPR workshop on Object Tracking and Classification Beyond the Visible Spectrum (OTCBVS'04) 2004.

Y. Owechko, et al., "Vision-Based Fusion System for Smart Airbag Applications," Intelligent Vehicle Symposium, 2002. IEEE. Publication Date: Jun. 17-21, 2002, vol. 1, on pp. 245-250 vol. 1.

Y. Owechko and S. Medasani, "A Swarm-based Volition/Attention Framework for Object Recognition," IEEE Conference on Computer Vision and Pattern Recognition, San Diego, Proc. of CVPR-WAPCV 2005.

Y. Owechko and S. Medasani, "Cognitive Swarms for Rapid Detection of Objects and Associations in Visual Imagery," IEEE Swarm Intelligence Symposium, Pasadena, 2005.

P. Saisan, S. Medasani, and Y. Owechko "Multi-View Classifier Swarms for Pedestrian Detection and Tracking," IEEE Conference on Computer Vision and Pattern Recognition, San Diego, 2005.

N. Srinivasa, et al., "Fuzzy edge-symmetry features for enhanced intruder detection," 11th International Conference on Fuzzy Systems, FUZZIEEE 2003.

F. Orabona, G. Metta, and G. Sandini, "Object-based Visual Attention: A Model for a Behaving Robot," In 3rd International Workshop on Attention and Performance in Computational Vision (in CVPR 2005), San Diego. CA, Jun. 2005.

B. J. Scholl, "Objects and Attention: The State of the Art," Cognition 80: 1-46, 2001.

Y. Sun and R. Fisher, "Hierarchical Selectivity for Object-based Visual Attention," Submitted to Artificial Intelligence, 2004.

Liao, Wenhul and Ji, Qiang 2006, "Efficient Active Fusion for Decision-making via VOI Approximation," In Proc. AAAI 2006, 1180-1185.

Jaynes, C., Stolle, F., and Collins, R., "Task Driven Perceptual Organization for Extraction of Roofop Polygons," Proceedings of the ARPA Image Understanding Workshop, Monterey, California (Morgan Kaufmann Publishers, San Francisco, 1994), pp. 359-365.

A. Huertas, and R. Nevatia, "Detecting Changes in Aerial Views of Man-Made Structures," IVC200.

R. Mendes, "The Fully Informed Particle Swarm: Simpler, Maybe Better," Special issue of IEEE Trans. on Evol. Computation on Particle Swarm Optimization, vol. 8, No. 3, Jun. 2004.

K.E. Parsopoulos, et al. "On the Computation of All Global Minimizers Through Particle Swarm Optimization," Special issue of IEEE Trans. on Evol. Computation on Particle Swarm Optimization, vol. 8, No. 3, Jun. 2004.

F. van der Bergh, et al., "A Cooperative Approach to Particle Swarm Optimization," Special issue of IEEE Trans. on Evol. Computation on Particle Swarm Optimization, vol. 8, No. 3, Jun. 2004.

A. Ratnaweera, "Self-Organizing hierarchical particle Swarm Optimizer with Time-Varying Acceleration Coefficients," Special issue of IEEE Trans. on Evol. Computation on Particle Swarm Optimization, vol. 8, No. 3, Jun. 2004.

C.A. Coello, "Handling Multiple Objectives With Particle Swarm Optimization," Special issue of IEEE Trans. on Evol. Computation on Particle Swarm Optimization, vol. 8, No. 3, Jun. 2004

L. Messerschmidt, et al., "Learning to Play Games Using a PSO-Based Competitive Learning Approach," Special issue of IEEE Trans. on Evol. Computation on Particle Swarm Optimization, vol. 8, No. 3, Jun. 2004.

M.P. Wachwiak, et al., "An Approach to Multimodal Biomedical Image Registration Utilizing Particle Swarm Optimization," Special issue of IEEE Trans. on Evol. Computation on Particle Swarm Optimization, vol. 8, No. 3, Jun. 2004.

R. Hassan, B. Cohanim, and O. de Weck, "A Comparison of Particle Swarm Optimization and the Genetic Algorithm," AIAA Conference, 2005.

J.F. Schutte, J.A. Reinbolt, B.j. Fregly, R.T. Haftka, and A.D. George, "Parallel Global Optimization with the Particle Swarm Algorithm," Int. J. Numerical methods in Engineering, 61: 2296-2315, 2004.

J. Kennedy and W.M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, 78-83, 1998.

Bradski, G. and S. Grossberg (1995), "Fast learning VIEWNET architectures for recognizing 3-D objects from multiple 2-D views," Neural Networks 8, 1053-1080.

Charniak, E. (1991), "Bayesian networks without tears," AI Magazine 12, 50-63.

Hu, W., D. Xie, et al. (2004), "Learning activity patterns using fuzzy self-organizing neural network," IEEE Transactions on Systems, Man, and Cybernetics—Part B: Cybernetics 34, 1618-1626.

Lazebnik, S., C. Schmid, et al. (2006), "Beyond bags of features: Spatial pyramid matching for recognizing natural scene categories," IEEE Conference on Computer Vision and Pattern Recognition, New York, NY.

Lowe, D. (1999), "Object recognition from local scale-invariant features," International Conference on Computer Vision, Corfu, Greece.

Medasani, S. and Y. Owechko (2007), "Behavior recognition using cognitive swarms and fuzzy graphs," SPIE Defense and Security Symposium, Orlando, FL.

S. Medasani, and Y. Owechko, "Possibilistic Particle Swarms for Optimization," Proceedings 5673 of SPIE/IST Symposium on Electronic Imaging, San Jose, 2005.

Park, S. and J. Aggarwal (2003), "A hierarchical Bayesian network for event recognition of human actions and interactions," ACM SIGMM International Workshop on Video Surveillance, Berkely, CA.

Barbara Zitova and Jan Flusser, "Image registration methods: a survey," Image and Vision Computing 21, pp. 977-1000, 2003.

B. Bhanu, et al., "Adaptive Image Segmentation Using a Genetic Algorithm," IEEE Transactions on Systems, Man, and Cybernetics, vol. 25, No. 12, Dec. 1995.

Office action from U.S. Appl. No. 10/918,336; our ref. No. HRL155.

Notice of Allowability for U.S. Appl. No. 11/367,755.

Notice of Allowability for U.S. Appl. No. 11/385,983.

Notice of Allowability for U.S. Appl. No. 11/433,159.

Reply to Notice of Allowance for U.S. Appl. No. 11/433,159.

Notice of Allowability for U.S. Appl. No. 10/918,336.

Notice of Allowability for U.S. Appl. No. 11/800,265.

Khosla, D., Moore, C., and Chelian, S. (2007). A Bioinspired system for spatio-temporal recognition in static and video imagery. Proceedings of SPIE, 6560: 656002.

Judea Pearl, et al., "Bayesian Networks," Handbook of Brain Theory and Neural Networks, Technical Report, R-277, Nov. 2000.

Avrim Blum (1996), "On-Line Algorithms in Machine Learning", In Proceedings of the Workshop on On-Line Algorithms.

* cited by examiner

|     | (a) | (b) | (c) | (d) | (e) | (f) | (g) | (h) | <-classified as |
| --- | --- | --- | --- | --- | --- | --- | --- | --- | --- |
| 6   |     |     |     |     |     |     |     |     | (a): class 1 (Cantilevered Lamp Post, 100%) |
| 1   | 21  |     |     |     |     | 1   |     | 1   | (b): class 2 (Cantilevered Traffic Light, 88%) |
| 1   | 1   | 11  |     |     |     |     |     | 9   | (c): class 6 (Foliage, 50%) |
| 1   | 1   |     | 48  | 1   |     |     |     | 1   | (d): class 7 (Free-Standing Sign, 94%) |
|     |     |     |     | 54  |     |     |     |     | (e): class 8 (Lamp Post, 100%) |
|     |     |     | 2   |     | 6   | 2   |     | 1   | (f): class 12 (Pole, 55%) |
| 2   |     |     |     | 1   | 2   | 45  |     | 4   | (g): class 14 (Telephone Pole, 83%) |
| 1   |     | 2   |     | 2   |     |     |     | 186 | (h): class 17 (Tree, 97%) |

FIG. 7

THREE-DIMENSIONAL (3D) OBJECT RECOGNITION SYSTEM USING REGION OF INTEREST GEOMETRIC FEATURES

STATEMENT OF GOVERNMENT RIGHTS

This invention was made with Government support under contract number HM1582-07-C-0017, entitled, "Urban Reasoning and Geospatial Exploitation Technology (URGENT)," awarded by DARPA. The Government has certain rights in this invention.

FIELD OF INVENTION

The present invention relates to an object recognition system and, more particularly, to three-dimensional (3D) object recognition system that classifies an object using expanding global region of interest geometric features.

BACKGROUND OF INVENTION

The present invention relates to a three-dimensional (3D) object recognition system that classifies an object using expanding global region of interest geometric features. While methods for 3D object recognition exist, existing methods are very different than the present invention. The existing methods are based on variants of spin images or 3D shape contexts. Neither of the existing approaches take advantage of the difference in z and x-y variations of natural and artificial physical objects that are naturally tied to the ground plane. For example, spin images require the estimation of accurate normal vectors on a surface mesh enclosing the object. Further, normal vectors are sensitive to noise and are inaccurate unless the sampling density is high. Additionally, spin images also need to be defined on a set of points on the object. Using a large number of points and large domains for each point results in memorization of the training objects rather than learning, resulting in "brittle" classifiers. This noise sensitivity and brittleness means that recognition systems based on spin images do not work well if the objects exhibit large intra-class variability, the spatial sampling is not high, or if noise is present.

Alternatively, 3D shape contexts use a feature vector which is essentially a 3D histogram of the point cloud data. The histogram bins are 3D angular sector volumes that form a sphere centered on the object or on points of interest on the object. 3D shape contexts do not utilize the geometric information encoded in the point cloud data. Instead, the histogram bins describe how many points are present in a spatial region. Unlike the present invention, the shape context histogram bins are not invariant to rotation of the object or local object region in azimuth.

Thus, a continuing need exists for a 3D object recognition system that is invariant to rotation of the object or rotation of a local object region in azimuth.

The present invention solves this need by using rotationally invariant (in azimuth angle) geometric relationships between region of interest (ROI) volumes and contiguous object parts intersected by or contained within the ROI. The resulting features or shape descriptors contain higher level information about the 3D objects as compared to prior art. While the prior art encodes low level information about the locations of points in 3D space, the present invention encodes the higher level geometric properties of the objects and their components without the need for calculating surface meshes or 3D models of the objects. This reduces the number of training examples required and improves classification robustness relative to prior art.

SUMMARY OF INVENTION

The present invention relates to a three-dimensional (3D) object recognition system that classifies an object using expanding global region of interest geometric features. The system comprises a memory module and a processor. The memory module is encoded with instruction means that are executable by the processor for causing the processor to perform several operations, such as receiving an implicit geometry representation regarding a three-dimensional (3D) object of interest. A region of interest (ROI) is then centered on the implicit geometry representation such that there is at least one intersection area between the ROI and the implicit geometry representation. Object shape features can be calculated that reflect a location of the ROI with respect to the implicit geometry representation. The object shape features can then be assembled into a feature vector. A classification confidence value is then generated (using a statistical classifier) with respect to a particular object classification. Finally, the 3D object of interest is then classified as a particular object upon the classification confidence value reaching a predetermined threshold.

In another aspect, in centering a ROI, the ROI is columnar volume centered on the object. The ROI is a columnar volume selected from a group consisting of a cuboid volume and a cylindrical volume.

In the operation of calculating object shape features, the object shape features are invariant to rotation of the object about a z-axis as the features depend solely on properties such as the areas of intersection of the object with the ROI and on the number and size of the contiguous objects enclosed by the ROI.

The processor is further configured to perform an operation of centering a series of expanding ROI volumes on the object of interest, resulting in a set of intersection areas and a corresponding set of object shape features, whereby variations of an object's shape with radial distance from its z-axis are captured by using the series of ROIs of increasing size.

In yet another aspect, the processor is further configured to calculate the object shape features for each ROI to form the set of object shape features and concatenating the set of object shape features into an NM-dimensional feature vector where N is the number of features and M is the number of ROIs.

In the operation of centering a series of expanding ROI volumes on the object of interest, the ROIs are each centered on a different portion of the object of interest.

In the operation of receiving an implicit geometry representation, the implicit geometry representation is a population or distance function representation of three-dimensional (3D) point cloud data sampled on a regular grid.

In the operation of calculating object shape features, the object shape features are based on a number of contiguous objects enclosed by the ROI and on the intersection areas between the implicit geometry representation and the ROI.

In yet another aspect, the ROI includes a top surface, bottom surface, and side surfaces, and wherein in the operation of calculating object shape features, the object shape features are selected from a group comprising:
 a. a number of contiguous objects in the ROI;
 b. a number of bottom surface intersecting objects;
 c. a number of side surface intersecting objects;
 d. a number of top surface intersecting objects;
 e. a ROI volume fraction occupied by objects;

f. a fraction of ROI surface intersected by objects;
g. a fraction of ROI bottom surface intersected by, objects;
h. a fraction of ROI side surface intersected by objects;
i. a fraction of ROI top surface intersected by objects;
j. a fraction of ROI side surface intersected by bottom surface intersecting objects;
k. a fraction of ROI top surface intersected by bottom surface intersecting objects;
l. a ROI volume fraction occupied by objects multiplied by the ROI volume;
m. a fraction of ROI surface intersected by objects multiplied by the ROI area;
n. a fraction of ROI bottom surface intersected by objects multiplied by the ROI bottom area;
o. a fraction of ROI side surface intersected by objects multiplied by the ROI side area;
p. a fraction of ROI top surface intersected by objects multiplied by the ROI top area;
q. a fraction of ROI side surface intersected by bottom intersecting objects multiplied by the ROI area;
r. a fraction of ROI top surface intersected by bottom intersecting objects multiplied by the ROI top area;
s. a maximum diameter of local point cloud in z-dimension; and
t. a maximum diameter of local point cloud in x-y plane.

It is to be understood that the list provided above is for illustrative purposes only and is not intended to be a closed or exhaustive list. For example, depending on the application other shape features may be included or needed.

In yet another aspect, in the operation of centering a ROI on the object of interest, the ROI is formed of a plurality of smaller ROI volumes that cover the object of interest, resulting in a set of intersection areas and a corresponding set of object shape features, whereby variations of an object's shape are captured by using the plurality of smaller ROI volumes and by reporting the shape features as histograms in order to preserve rotational invariance.

Additionally, in the operation of calculating object shape features, the object shape features are calculated based on a number of contiguous object components enclosed by each ROI, the intersection areas between the object components and each ROI, and a volume fraction of each ROI occupied by the object components.

The present invention also includes a method for object recognition. The method comprising an act of causing a processor to perform the operations described herein. Finally, the present invention also includes a computer program product. The computer program product comprising computer-readable instruction means stored on a computer-readable medium that are executable by a computer for causing the computer to perform the said operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7 is an illustration of a confusion table for test set classification results using a decision tree machine learning algorithm and the single ROI feature data shown in FIG. 6.

DETAILED DESCRIPTION

Figure 1:
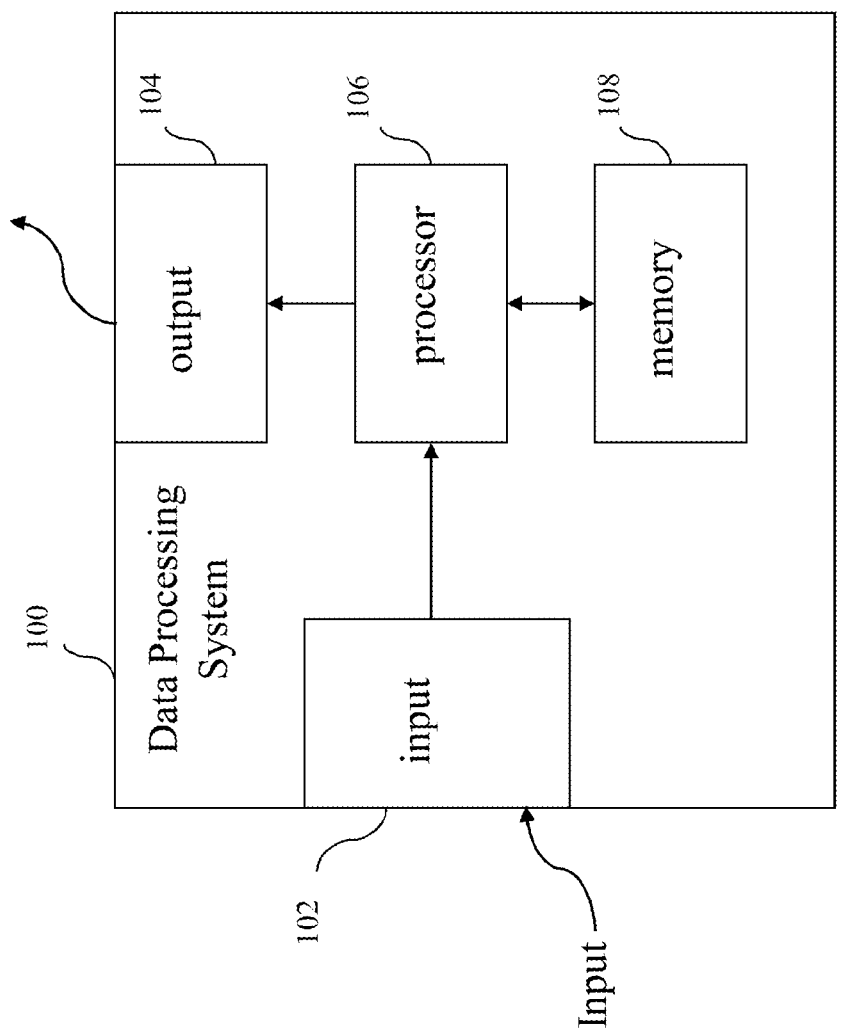
FIG. 1 is a block diagram depicting the components of a 3D object recognition system of the present invention.

The present invention relates to an object recognition system and, more particularly, to three-dimensional (3D) object recognition system that classifies an object using expanding global region of interest geometric features. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is provided. Next, a description of various principal aspects of the present invention is provided. Subsequently, an introduction provides the reader with a general understanding of the present invention.

Finally, details of the present invention are provided to give an understanding of the specific aspects.

(1) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Columnar—The term "columnar" with respect to the present invention refers to a shape of a region of interest (ROI) in which the shape includes a top, a bottom, and any number of sides.

Feature vector—The term "feature vector" generally refers to any function that describes topological properties of the point cloud within the ROI and how the point cloud intersects the sides and top or bottom of the ROI.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Point Cloud—The term "point cloud" generally refers to a set of points in three-dimensional (3D) space, each of which represents the location and reflectivity or color of a point on a surface in a 3D real-world scene. The points may be irregularly arranged in 3D space. Point cloud data comprises files which list the (x, y, z) spatial coordinates of points along with the reflectivity and/or (red, green, blue) values associated with each point. Point cloud data can now be routinely collected for large urban scenes using both ground-based and airborne light detection and ranging (LIDAR) sensor platforms.

Region of Interest (ROI)—The term "region of interest" as used with respect to this invention generally refers to an imaginary volume which encompasses a region of 3D space containing the point cloud, or a subset thereof, to be analyzed with respect to recognizing an object therein.

(2) Principal Aspects

The present invention has three "principal" aspects. The first is 3D object recognition system. The object recognition system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a 3D object recognition system of the present invention is provided in FIG. 1. The 3D object recognition system 100 comprises an input 102 for receiving information from at least one sensor for use in detecting a 3D object in a scene. Note that the input 102 may include multiple "ports." Typically, input is received from at least one sensor, non-limiting examples of which include video image sensors, time of flight sensors, or light detection and ranging (LIDAR) sensors. An output 104 is connected with the processor for providing information regarding the presence and/or identity of object(s) in the scene to other systems in order that a network of computer systems may serve as a object recognition system. Output may also be provided to other devices or other programs; e.g., to other software modules, for use therein. The input 102 and the output 104 are both coupled with a processor 106 (or processors), which may be a general-purpose computer processor or a specialized processor designed specifically for use with the present invention. The processor 106 is coupled with a memory 108 to permit storage of data and software that are to be manipulated by commands to the processor 106.

Figure 2:
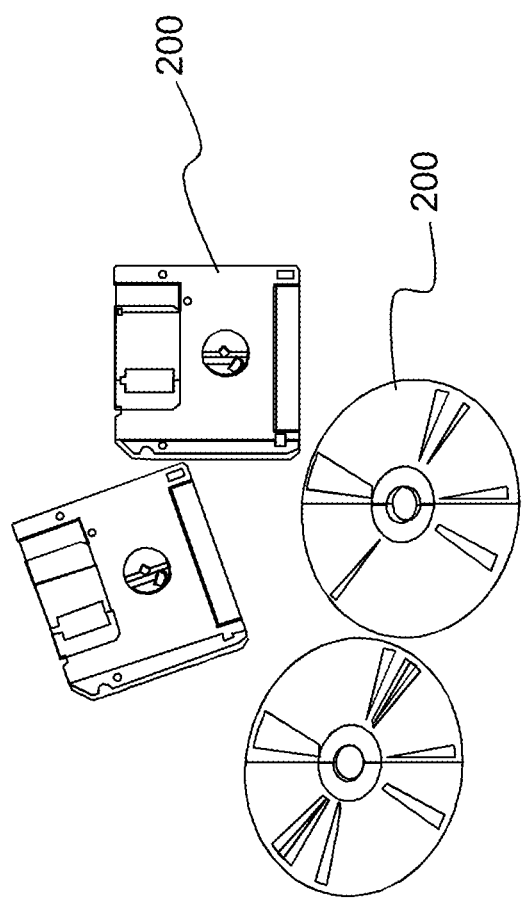
FIG. 2 is an illustration of a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible computer-readable medium.

(3) Introduction

The present invention describes a method for recognizing objects automatically in colorized three-dimensional (3D) point cloud data. Such data can be generated using a variety of 3D sensors, non-limiting examples of which include light detection and ranging (LIDAR), 3D laser scanners, time-of-flight imagers, and stereo imagers. The present invention improves upon the prior art through its use of rotation-invariant shape descriptors or features that capture the geometric relationships between a single (or multiple) 3D cuboid or cylindrical region of interest (ROI) volume and an implicit geometry representation of the point cloud data. A cuboid is a well-known 3D geometric object, defined as a rectangular parallelepiped (by being square, it maximizes the rotational invariance of the features with respect to the z-axis). The implicit geometry representation is a population or distance function (defined below) representation of the 3D point cloud data sampled on a regular grid.

For example, a population function for an input point cloud is created as follows. First the extent of the point cloud extent is partitioned into cells based on a selected resolution. Usually, a higher resolution results in more cells than a coarser resolution. For each cell, the number of points in that cell is accumulated and stored in a 3D array. The resulting fully populated 3D array is the population function wherein a non-zero cell indicates that there are points that fall within that cell boundaries. Note that if the desired resolution is changed, then another populated function can be created. The population function can then be parsed using a grammar token and in turn the grammar token can be used to generate geometric features. A distance function is defined similarly, except that each cell contains the distance from that cell to the nearest non-zero cell. A desirable distance function is the Euclidean distance; however, other suitable possibilities exist, non-limiting examples of which include the Manhattan distance and the Chebyshev distance The implicit geometry representation converts the irregular sampling and ill-defined resolution of the raw point cloud data into a regularly sampled representation with variable resolution that allows basic operations (such as noise removal and detection of contiguous objects) to be implemented efficiently. The present invention uses both single and multiple ROIs centered on the 3D object to generate feature values that represent geometric quantities (object shape features). Examples of such object shape features include the number of contiguous objects contained within the ROI, the area of the intersection of objects/components with the sides, top, or bottom of the ROI, the volume fraction of the ROI occupied by objects/components, and other related quantities. The variation of an object's shape with radial distance from its center is captured by using a nested series of ROIs of increasing size. The resulting set of features are concatenated into a feature vector (or formed into a histogram for each feature type) that is recognized as a previously learned object using machine learning methods (such as decision trees or neural networks).

The present invention implements a new approach to 3D object recognition that is more robust than previous approaches and does not require an object to be isolated from other objects or its environment. The approach takes advantage of properties of objects in real environments by distinguishing between the z-coordinate axis and the x-y axes (where z is normal to the ground plane and x-y define the ground plane). Natural and artificial objects are influenced by gravity, which results in differences in object shape properties in the vertical (elevation) and horizontal (azimuth) directions. Robustness is enhanced by defining the shape descriptors or features so that they are invariant to rotations of the object (or local rotations) in the x-y or azimuth plane. This also eliminates the need to search in rotation angle to match the local features with a stored object signature. The histogram form of the multiple ROI shape descriptor described below is also invariant to global rotation of the object in azimuth. By converting the raw point cloud data into a regularly sampled population density function, the implicit geometry representation allows the geometric features to be easily calculated. The spatial sampling resolution can also be easily varied to optimize the trade-off between computational complexity, data sampling density, noise levels, and representation accuracy.

The present invention is applicable to programs that utilize 3D point cloud data generated by LIDAR, time-of-flight imagers, laser scanners, stereo imagers, or other sensors for sensing and automated understanding of 3D environments. For example, future commercial vehicles may use LIDAR to enable autonomous driving modes, including autonomous vehicles (such as those demonstrated at the Defense Advanced Research Projects Agency's (DARPA's) Grand Challenge competition for autonomous urban navigation). The present invention could be used to allow computers to recognize hundreds of different objects and build up a model for the scene automatically, thereby enabling much more complex autonomous behavior than is currently possible. The present invention can also be used to automatically monitor and track objects in factories in order to maximize safety and efficiency. The system can also be used for robotic vision applications in factory assembly lines or other applications. Thus, the present invention can be applied in many circumstances that need intelligent 3D sensing systems.

(4) Details of the Invention

Figure 3A:
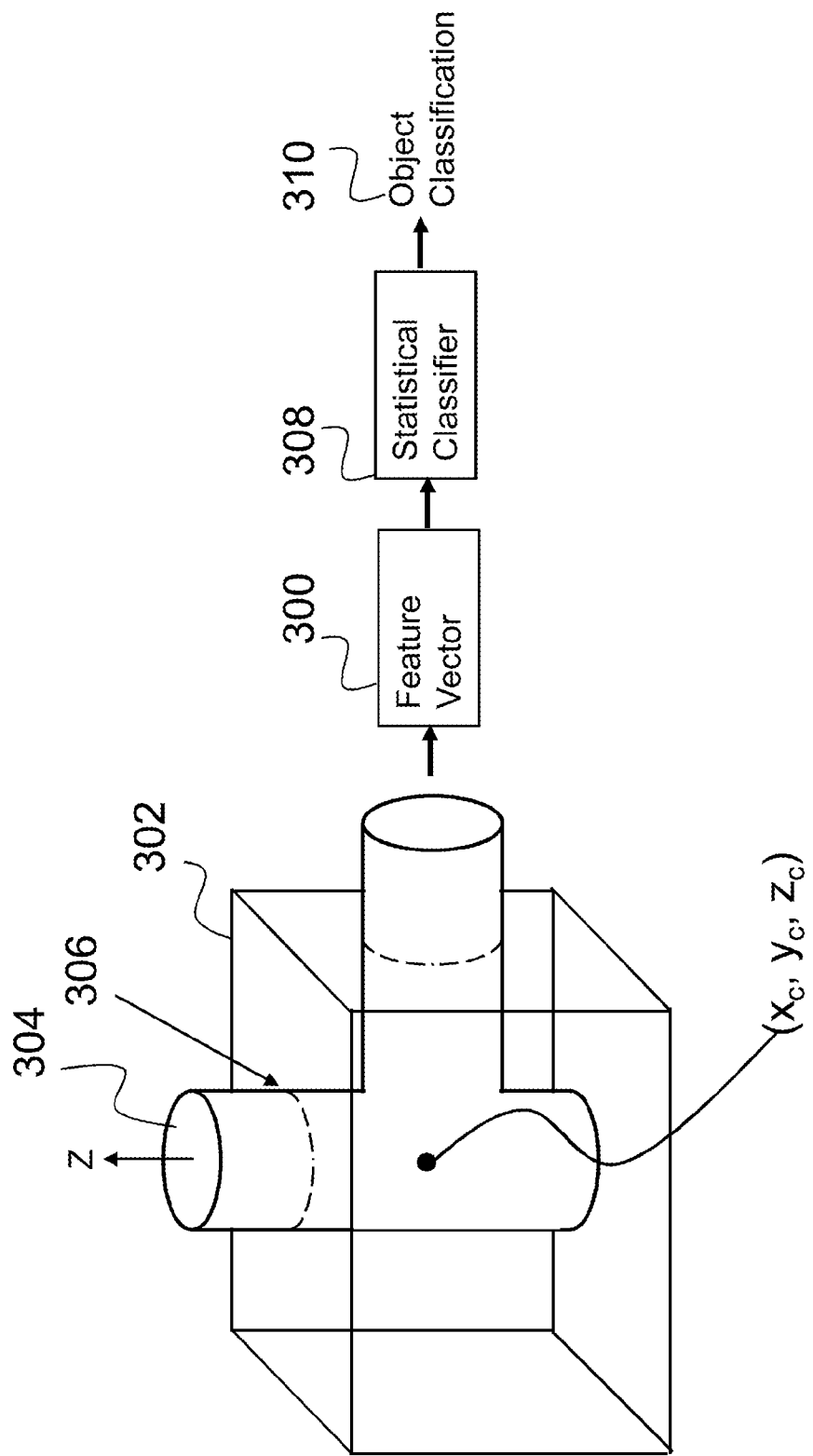
FIG. 3A is a processing flow for recognition of three-dimensional (3D) objects in point cloud data based on machine learning of region of interest (ROI) feature vectors.

As noted above, the present invention is directed to a method for recognizing objects automatically in 3D point cloud data. The present invention uses an implicit geometry representation that is a population or distance function representation of the 3D point cloud data sampled on a regular grid. As noted above, a desirable distance function is the Euclidean distance; however, other suitable possibilities exist, non-limiting examples of which include the Manhattan distance and the Chebyshev distance. FIG. 3A illustrates the processing flow for recognizing 3D objects using machine learning of region of interest (ROI) feature vectors 300 that are generated using the implicit geometry representations (i.e., object data 304) of the 3D data. The ROI feature vectors 300 are based on the relationship of the object data 304 with a single columnar ROI volume 302 (e.g., cuboid or cylindrical) centered ($x_c$, $y_c$, $z_c$) on the object 304. Object shape features are calculated based on the number of contiguous objects 304 enclosed by the ROI 302 and on the intersections 306 (i.e., intersection areas) of the object data 304 with the sides, top, and bottom of the ROI 302. The features are assembled into a feature vector 300 and used in machine learning algorithms (such as decision trees or neural networks) to generate statistical classifiers 308 for recognizing 3D objects with relatively large intra-class variability. The statistical classifier provides a classification confidence value with respect to a particular object classification. As a non-limiting example, the classification confidence value is a number from 1 to 100 indicating a degree of confidence that an object has been identified (with 100 being absolute certainty that the object has been identified, or vice versa). Finally, the object classification 310 is provided upon the output (i.e., classification confidence value) of the statistical classifier 308 reaching a predetermined threshold. As can be appreciated by one skilled in the art, the statistical classifier 308 is any suitable classifier, non-limiting examples of which include decision tree, support vector machine, and multi-layer neural network classifiers.

Figure 3B:
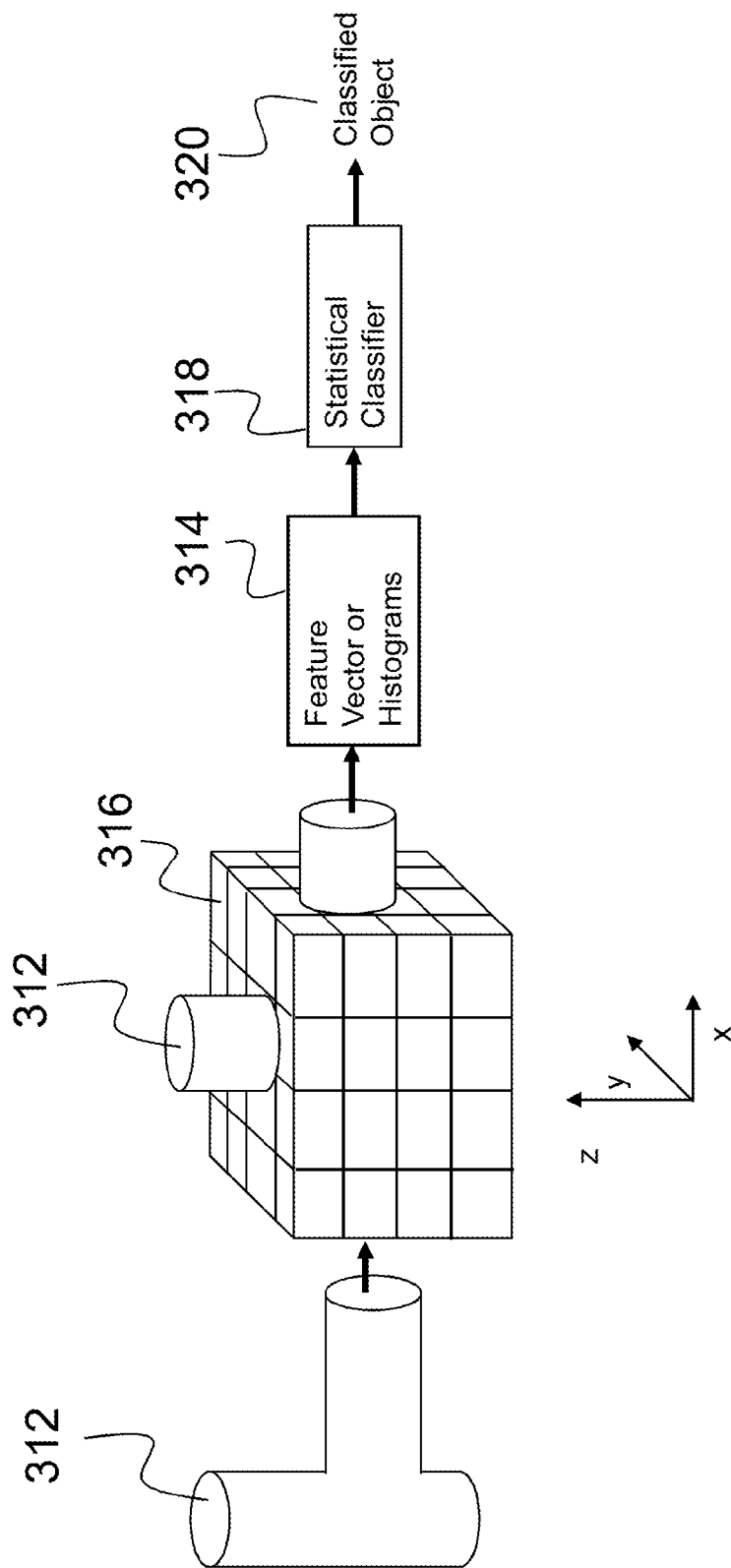
FIG. 3B is processing flow for recognition of 3D objects in point cloud data based on machine learning of feature vectors based on the relationship of the object data with multiple small local ROIs that cover the object.
Figure 8:
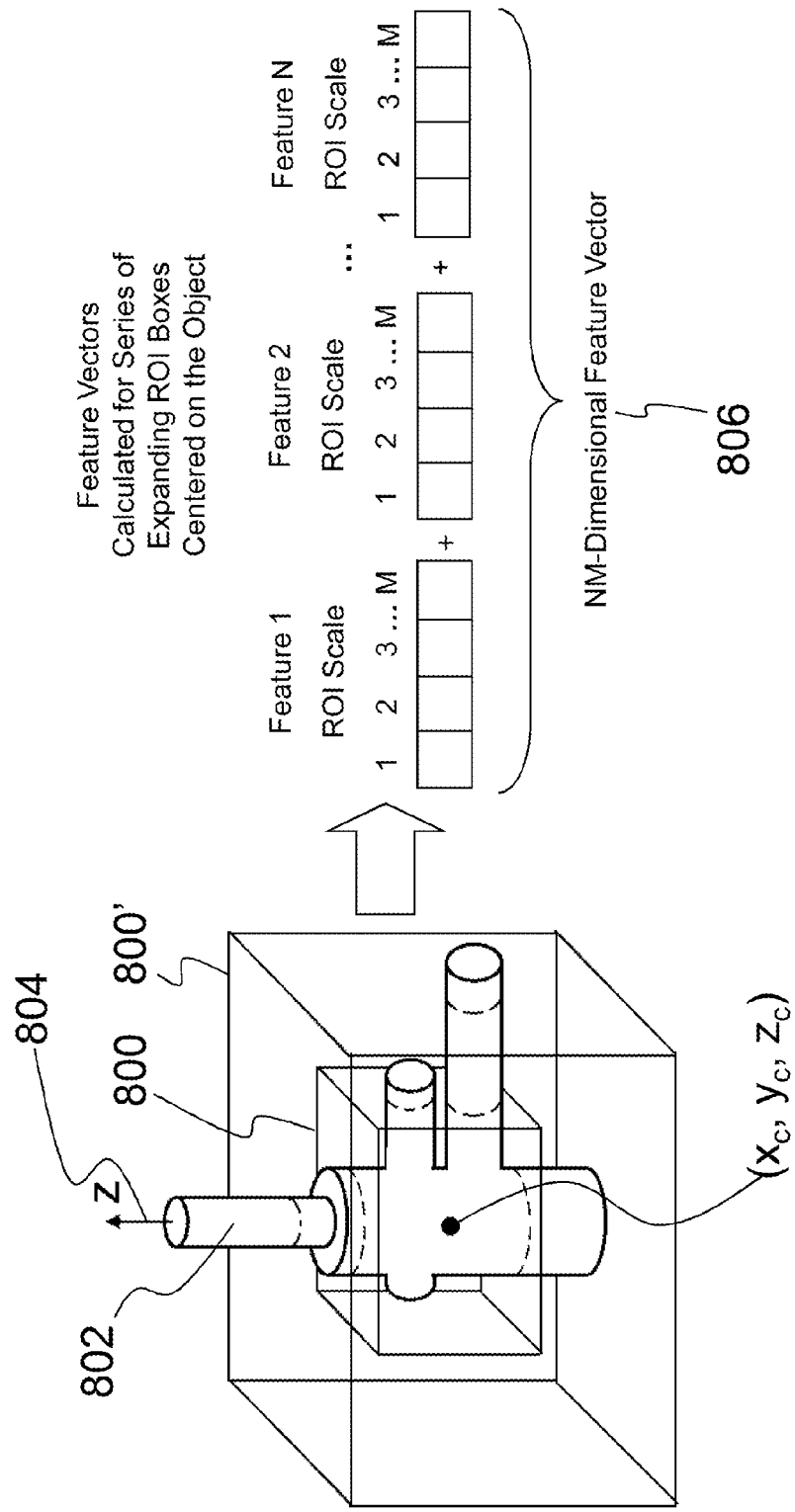
FIG. 8 is an illustration of shape descriptors or features for 3D object recognition based on the relationship of the object data with a series of expanding region of interest (ROI) volumes centered on the object.

The ROIs are defined in terms of their locations and size in the implicit geometry space. The values of variable resolution 3D "cells" or "voxels" in this space are determined by either the population function or the distance function. The resolution or size of the cells can be varied dynamically using the implicit representation. Once the center of analysis is determined using cueing or other means, then the set of ROIs can be arranged in two different ways. One way is to tile the space surrounding the center using ROIs of constant size, as shown in FIG. 3B. Another way is to used nested ROIs of variable sizes centered on the center, as shown in FIGS. 3A and 8.

In another aspect, the present invention can be implemented using multiple local ROIs. For example and as depicted in FIG. 3B, the recognition of 3D objects in point cloud data is based on machine learning of feature vectors 314 based on the relationship of the object data 312 with multiple small local ROIs 316 that cover the object data 312. As noted above, the object data 312 is an implicit geometry representation that is a population or distance function representation of the 3D point cloud data. Object shape features are calculated based on the number of contiguous object components enclosed by each ROI 316 and on the intersections (intersection areas) of the components with the sides, top, and bottom of each ROI 316. The number, shape, resolution, and arrangement of the local ROIs 316 can be adapted for each object class to maximize performance. Additionally, the ROIs 316 and the data can be indexed for efficient search using data structures, such as kd-trees. As was the case above, the object shape features are assembled into a feature vector 314 and used in machine learning algorithms to generate statistical classifiers 318 for recognizing 3D objects with relatively large intra-class variability. Finally, the object classification 320 is provided upon the output (i.e., classification confidence value) of the statistical classifier 318 reaching a predetermined threshold.

Histograms are an efficient way to combine the features extracted from multiple ROI boxes positioned at the object centroid. Features extracted from each of the ROI boxes can be aggregated using histograms. These features or object shape descriptors are calculated based on the number of contiguous object components enclosed by each ROI and on the intersections of the components with the sides, top, and bottom of the ROI. The features are invariant to rotation of the local object components about the z-axis (azimuth) of each local ROI because they depend only on the areas of intersection of the component with the ROI and on the number and size of contiguous components enclosed by the ROI. In addition, the histogram form of the features is invariant to global rotation of the object about its z-axis, provided it remains covered by the local ROI volumes.

Feature histograms are computed from the shape features extracted from each of the ROIs. For example', assume that there are 20 shape features and 10 ROIs. This results in a 20-dimensional feature vector from each of the ROIs. A histogram can then be computed for each of the 20 features resulting in 20 histograms. The histogram gives the frequency distribution of the number of ROIs having values for each feature. If each histogram was built using 5 bins, then all the histograms can be concatenated to get a 20×5=100D vector which would be the new feature vector.

Figure 4:
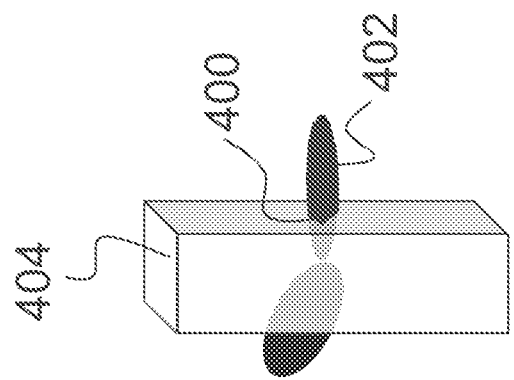
FIG. 4 is an illustration of a ROI volume and objects contained within or intersecting with the sides of the ROI volume.
Figure 4:
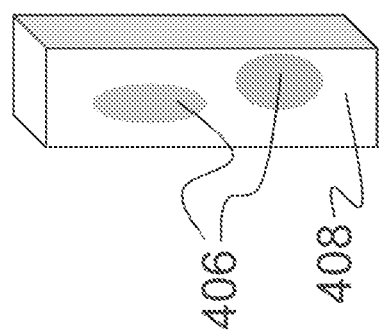

FIG. 4 illustrates graphical depictions of the types of object shape features that are used in the present invention. The object shape features are invariant to rotation of the object about the z axis (azimuth) because they depend only on the areas of intersection 400 of the object 402 with the ROI 404 and on the number and size of contiguous objects 406 enclosed by the ROI 408.

Figure 5:
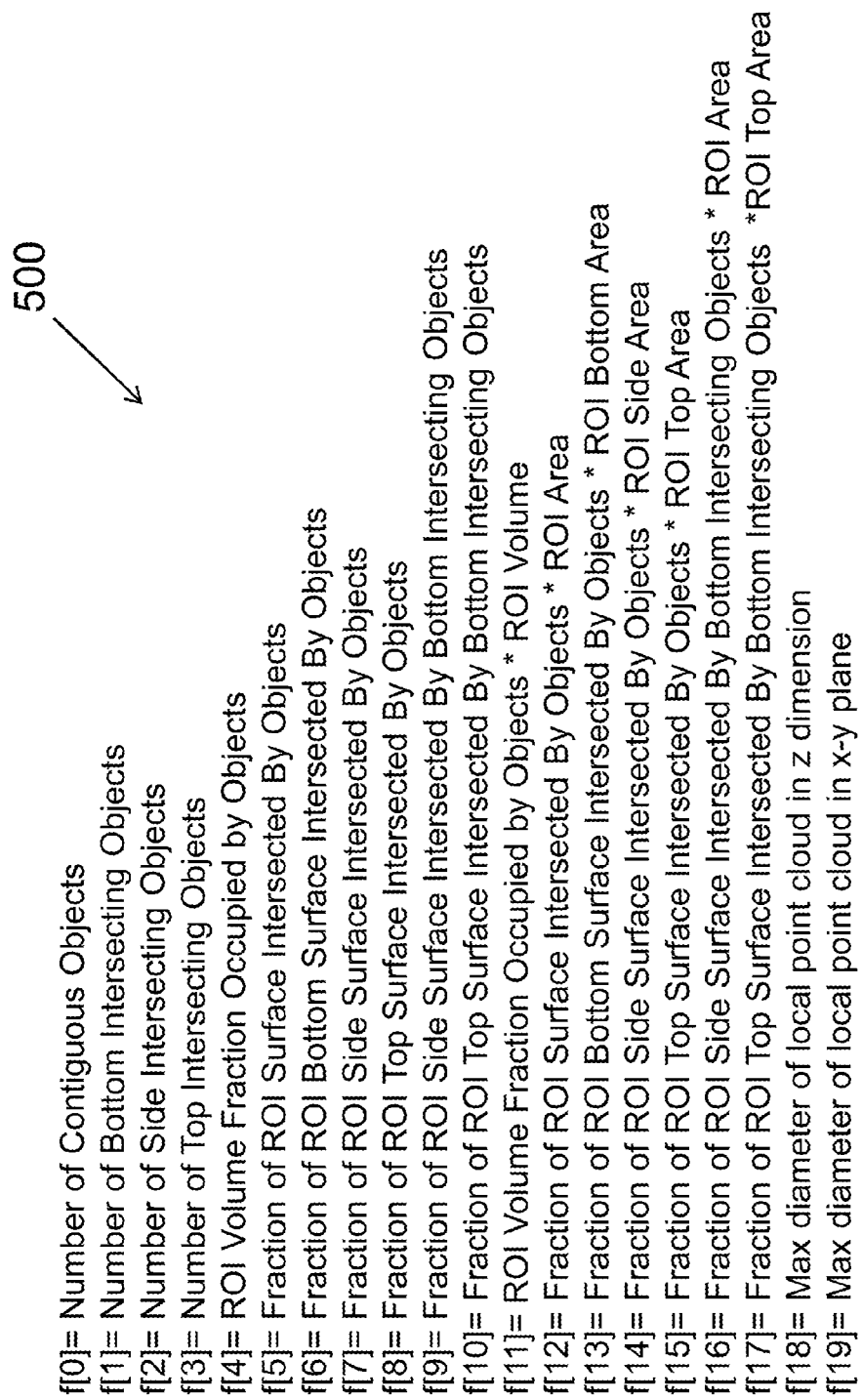
FIG. 5 is a table listing definitions of example azimuth rotation-invariant feature functions (object shape features) which describe the shape and size characteristics of objects with respect to a defined cuboid or cylindrical ROI volume.

FIG. 5 is a listing of definitions of example azimuth rotation-invariant feature functions (i.e., object shape features 500) which describe the shape and size characteristics of objects/components with respect to a defined columnar ROI volume (e.g., cuboid or cylindrical ROI volume). The object shape features 500 can be efficiently calculated with spatial resolution matched to the object/component size using implicit geometry representations based on volume fields, such as population density or distance functions. The object shape features 500 represent higher level geometric properties of 3D objects and their components without the need for calculating surface meshes or 3D models. These features 500 enable 3D object recognition that does not require an object to be isolated from other objects or its environment. The use of the object shape features 500 takes advantage of properties of objects in real environments by distinguishing between the z coordinate axis and the x-y axes (where z is normal to the ground plane and x-y define the ground plane). Natural and artificial objects are influenced by gravity, which results in differences in object shape properties in the vertical (elevation) and horizontal (azimuth) directions. Additionally, robustness is enhanced by defining the object shape features so that they are invariant to rotations of the object in the x-y or azimuth plane. Using definitions that are invariant to rotations eliminates the need to globally rotate the point cloud data in azimuth to match features with a stored object signature. By converting the raw point cloud data into a regularly sampled population density function (i.e., an implicit geometry representation), the implicit geometry representation allows the geometric features to be easily calculated. The spatial sampling resolution can also be easily varied to optimize the trade-off between computational complexity, data sampling density, noise levels, and representation accuracy.

Figure 6:
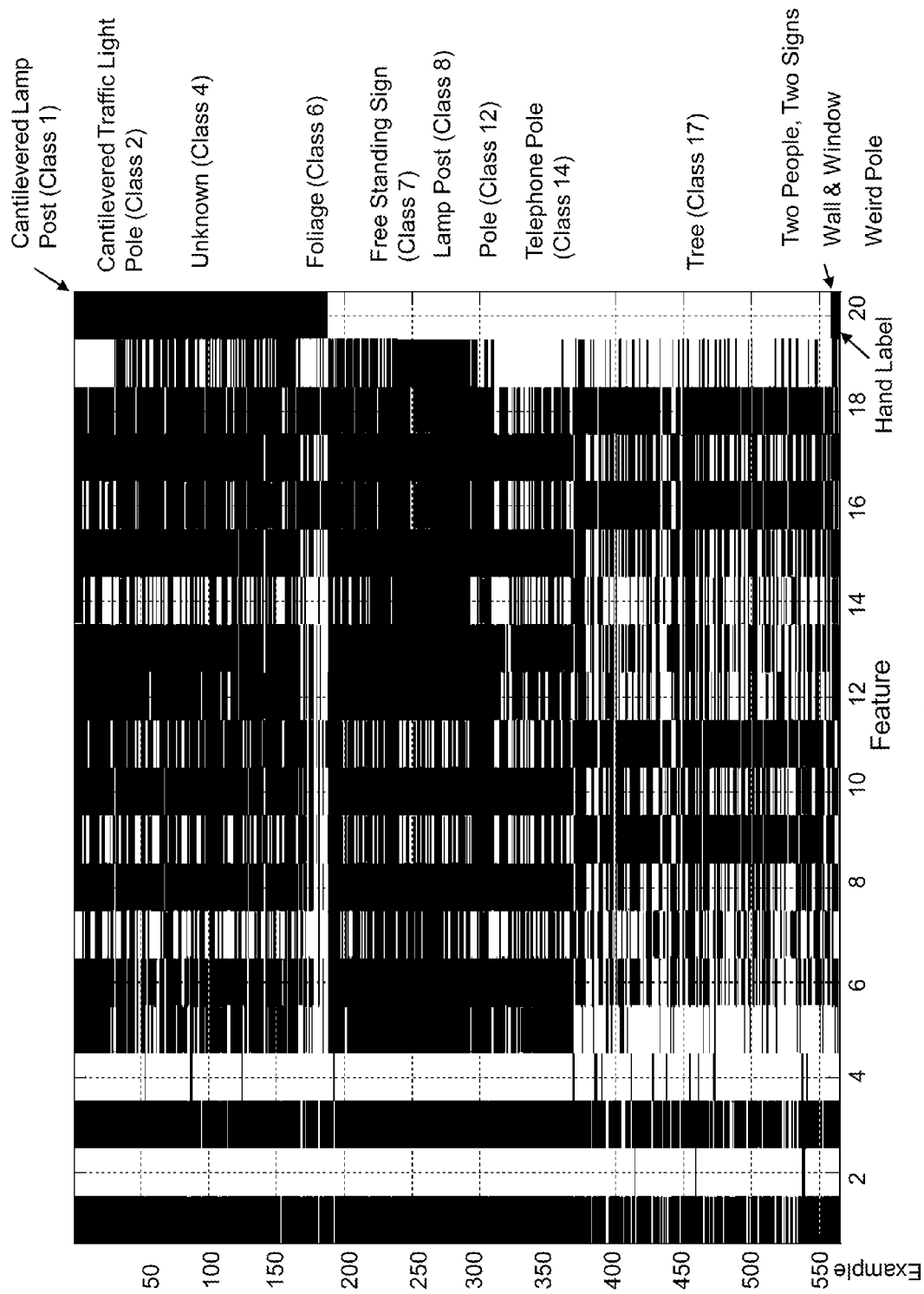
FIG. 6 is an illustration of a stack plot of feature vectors for a single global ROI.

An example stack plot of ROI feature vectors for a single global ROI, organized by object type, is shown in FIG. 6. FIG. 6 illustrates token feature vectors sorted by hand label and randomly within label. Features are indexed horizontally and objects are indexed vertically. Objects belonging to the same class are grouped together. Characteristic signatures for different object classes are visually evident by the presence of apparent horizontal boundaries between classes.

FIG. 6 is a stack plot wherein the rows are the feature vectors that correspond to each of the objects. The columns are the individual feature values that constitute the feature vector. The feature vectors extracted from each class of objects, poles, walls, etc, are bunched together into blocks. Since feature vectors from a class of objects tend to be similar, distinctive patterns can be seen in each block in FIG. 6, such that the boundaries between object classes can be visualized by looking at the block differences (although depicted in black and white, in operation, the stack plot is generated with colors such that colors that would otherwise be depicted in FIG. 6 to indicate the magnitude of the feature value normalized to be between 0 and 1.) Thus, the stack plot also tells us how much of each feature is expressed by the different classes being analyzed.

This data was divided into separate training and testing sets and used in a decision tree machine learning algorithm. As can be appreciated by one skilled in the art, any commonly used data mining tool that extracts informative patterns from data by discovering patterns that delineate categories, assembling them into classifiers, and using them to make predictions, can be used. Any classifier or machine learning algorithm can be used.

A confusion table showing the test set classification results is shown in FIG. 7. FIG. 7 shows the class-by-class performance of a multi-class classifier trained on feature vectors generated using a single ROI. Each row of the table shows how many members of a test set input class were classified as each of the possible recognition categories a through h. If the performance was perfect, then the confusion table would be a diagonal matrix. The fact that the outputs tend to cluster around the diagonal shows that the classifier was successfully trained using the single ROI features. As can be appreciated by one skilled in the art, any standard classifier can be used with the present invention, non-limiting examples of which include decision tree, support vector machine, and multi-layer neural network classifiers.

As shown in FIG. 8, the single ROI features can be extended to a series of expanding ROI volumes 800 and 800' centered on the object 802. The variation of an object's shape with radial distance from its z-axis 804 is captured by using such a nested series of ROIs 800 and 800' of increasing size. Thus, the size of the ROIs increases from 800 to 800' in M steps. The resulting set of features is concatenated into a feature vector that is recognized as a previously learned object using machine learning methods (e.g., decision trees or neural networks). The object shape features are calculated for each ROI and concatenated into an NM-dimensional feature vector 806, where N is the number of features and M is the number of ROIs. The NM-dimensional feature vector 806 is invariant to rotation of the object about the z-axis (azimuth).

In another aspect and as can be appreciated by one skilled in the art, more flexible and expressive object shape features can be constructed by using multiple sets of expanding ROI volumes centered on various positions on the object. For example, one set could be centered on the bottom half of an object while another set is centered on the top half. Multiple sets would be appropriate for objects that are composed of components with very different radial variations in shape.

What is claimed is:

1. A computer implemented method for recognizing an object, comprising an act of causing a computer having a processor to perform acts of:

receiving an implicit geometry representation regarding a three-dimensional (3D) object of interest;

centering a region of interest (ROI) on the implicit geometry representation such that there is at least one intersection area between the ROI and the implicit geometry representation;

calculating object shape features that reflect a relationship of the ROI with respect to the implicit geometry representation;

assembling the object shape features into a feature vector;

generating a classification confidence value with respect to a particular object classification; and classifying the 3D object of interest as a particular object upon the classification confidence value reaching a predetermined threshold.

2. The method as set forth in claim 1, wherein in the act of centering a ROI, the ROI is a columnar volume centered on the object.

3. The method as set forth in claim 1, further comprising an act of centering a series of expanding ROI volumes on the object of interest, resulting in a set of intersection areas and a corresponding set of object shape features, whereby variations of an object's shape with radial distance from its z-axis are represented by using the series of expanding ROI volumes of increasing size.

4. The method as set forth in claim 3, further comprising an act of calculating the object shape features for each ROI to form the set of object shape features and concatenating the set of object shape features into an NM-dimensional feature vector where N is the number of features and M is the number of ROIs.

5. The method as set forth in claim 3, wherein in the act of centering a series of expanding ROI volumes on the object of interest, the ROIs are each centered on a different portion of the object of interest.

6. The method as set forth in claim 1, wherein in the act of receiving an implicit geometry representation, the implicit geometry representation is a function representation of three-dimensional (3D) point cloud data sampled on a regular grid.

7. The method as set forth in claim 1, wherein in the act of centering a ROI on the object of interest, the ROT is formed of a plurality of smaller ROI volumes that cover the object of interest, resulting in a set of intersection areas and a corresponding set of object shape features, whereby variations of an object's shape are captured by using the plurality of smaller ROT volumes and by repotting the shape features as histograms in order to preserve rotational invariance.

8. The method as set forth in claim 7, wherein in the act of calculating object shape features, the object shape features are calculated based on a number of contiguous object components enclosed by each ROI, the intersection areas between the object components and each ROI, and a volume fraction of each ROI occupied by the object components.

9. A computer program product for object recognition, the computer program product comprising computer-readable instruction means stored on a non-transitory computer-readable medium that are executable by a computer for causing, the computer to perform operations of:

receiving an implicit geometry representation regarding a three-dimensional (3D) object of interest;

centering a region of interest (ROI) on the implicit geometry representation such that there is at least one intersection area between the ROI and the implicit geometry representation;

calculating object shape features that reflect a location of the ROI with respect to the implicit geometry representation;

assembling the object shape features into a feature vector;

generating a classification confidence value with respect to a particular object classification; and classifying the 3D object of interest as a particular object upon the classification confidence value reaching a predetermined threshold.

10. The computer program product as set forth in claim 9, wherein in the operation of centering a ROI, the ROT is columnar volume centered on the object.

11. The computer program product as set forth in claim 9, further comprising instruction means for causing the processor to perform an operation of centering a series of expanding ROI volumes on the object of interest, resulting in a set of intersection areas and a corresponding set of object shape features, whereby variations of an object's shape with radial distance from its z-axis are represented by using the series of expanding ROI volumes of increasing size.

12. The computer program product as set forth in claim 11, further comprising, instruction means for causing, the processor to perform an operation of calculating the object shape features for each ROI to form the set of object shape features and concatenating the set of object shape features into an NM-dimensional feature vector where N is the number of features and M is the number of ROIs.

13. The computer program product as set forth in claim 11, wherein in the operation of centering a series of expanding ROI volumes on the object of interest, the ROIs are each centered on a different portion of the object of interest.

14. The computer program product as set forth in claim 9, wherein in the operation of receiving an implicit geometry representation, the implicit geometry representation is a population or distance function representation of three-dimensional (3D) point cloud data sampled on a regular grid.

15. The computer program product as set forth in claim 9, wherein in the operation of centering a ROI on the object of interest, the ROI is formed of a plurality of smaller ROI volumes that cover the object of interest, resulting in a set of intersection areas and a corresponding set of object shape features, whereby variations of an object's shape are captured by using the plurality of smaller ROI volumes and by reporting the shape features as histograms in order to preserve rotational invariance.

16. The computer program product as set forth in claim 15, wherein in the operation of calculating object shape features, the object shape features are calculated based on a number of contiguous object components enclosed by each ROI, the intersection areas between the object components and each ROI, and a volume fraction of each ROI occupied by the object components.

17. A system for object recognition, the system comprising a memory module and a processor, wherein the memory module is encoded with instruction means that are executable by the processor for causing the processor to perform operations of:

receiving an implicit geometry representation regarding a three-dimensional (3D) object of interest;

centering a region of interest (ROI) on the implicit geometry representation such that there is at least one intersection area between the ROI and the implicit geometry representation;

calculating object shape features that reflect a location of the ROI with respect to the implicit geometry representation;

assembling the object shape features into a feature vector;

generating, a classification confidence value with respect to a particular object classification; and classifying the 3D object of interest as a particular object upon the classification confidence value reaching a predetermined threshold.

18. The system as set forth in claim 17, wherein in the operation of centering a ROI, the ROI is columnar volume centered on the object.

19. The system as set forth in claim 17, further comprising instruction means for causing the processor to perform an operation of centering a series of expanding ROI volumes on the object of interest, resulting in a set of intersection areas and a corresponding set of object shape features, whereby variations of an object's shape with radial distance from its z-axis are represented by using the series of expanding ROI volumes of increasing size.

20. The system as set forth in claim 19, further comprising instruction means for causing the processor to perform an operation of calculating the object shape features for each ROI to form the set of object shape features and concatenating the set of object shape features into an NM-dimensional feature vector where N is the number of features and M is the number of ROIs.

21. The system as set forth in claim 19, wherein in the operation of centering a series of expanding ROI volumes on the object of interest, the ROIs are each centered on a different portion of the object of interest.

22. The system as set forth in claim 17, wherein in the operation of receiving an implicit geometry representation, the implicit geometry representation is a population or distance function representation of three-dimensional (3D) point cloud data sampled on a regular grid.

23. The system as set forth in claim 17, wherein in the operation of centering a ROI on the object of interest, the ROI is formed of a plurality of smaller ROI volumes that cover the object of interest, resulting in a set of intersection areas and a corresponding set of object shape features, whereby variations of an object's shape are captured by using the plurality of smaller ROI volumes and by reporting the shape features as histograms in order to preserve rotational invariance.

24. The system as set forth in claim 23, wherein in the operation of calculating object shape features, the object shape features are calculated based on a number of contiguous object components enclosed by each ROI, the intersection areas between the object components and each ROI, and a volume fraction of each ROI occupied by the object components.

* * * * *